June 25, 1957     D. G. RENNO     2,797,128
VEHICLE DOOR STRUCTURE
Filed Feb. 6, 1956     3 Sheets-Sheet 1

INVENTOR.
DONALD G. RENNO
BY
ATTORNEYS

June 25, 1957   D. G. RENNO   2,797,128
VEHICLE DOOR STRUCTURE
Filed Feb. 6, 1956   3 Sheets-Sheet 2
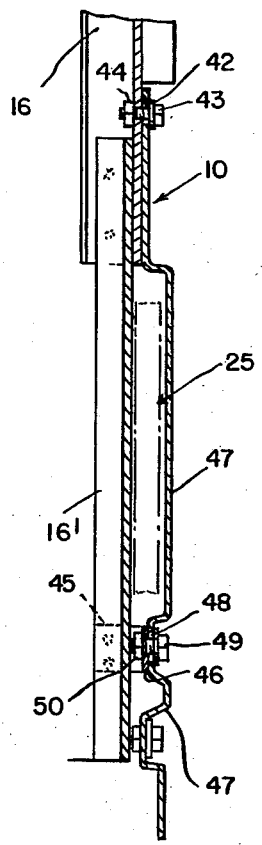
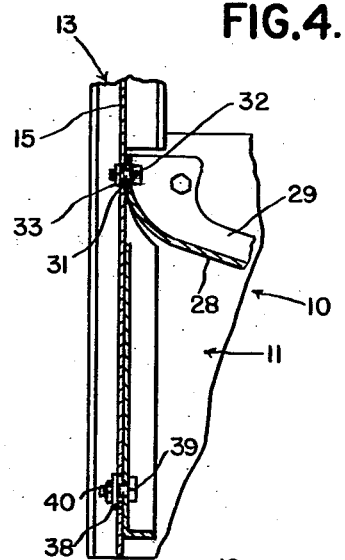
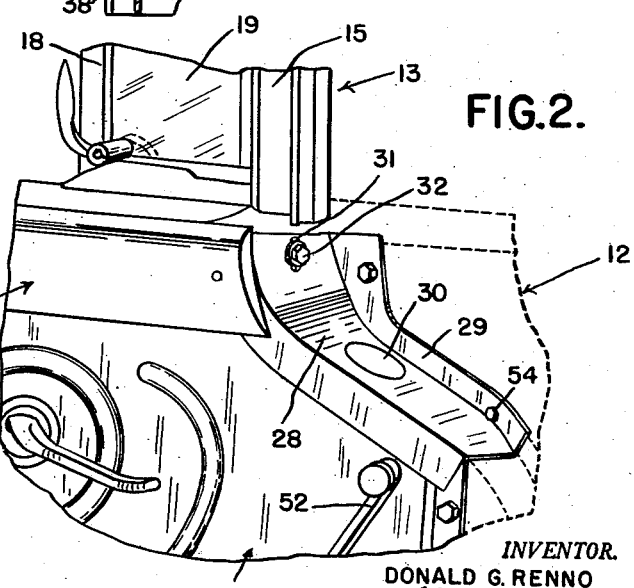
INVENTOR.
DONALD G. RENNO
ATTORNEYS June 25, 1957  D. G. RENNO  2,797,128
VEHICLE DOOR STRUCTURE
Filed Feb. 6, 1956  3 Sheets-Sheet 3
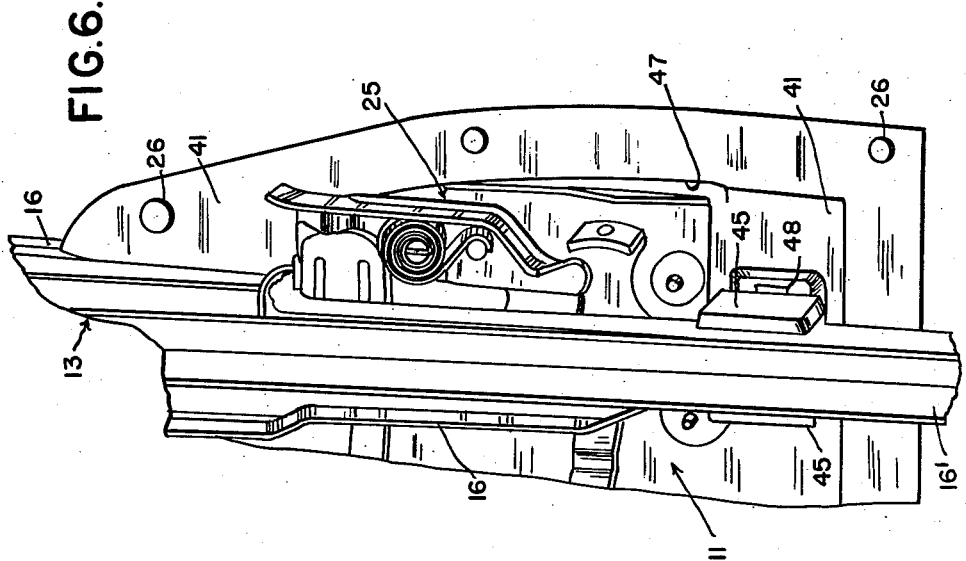
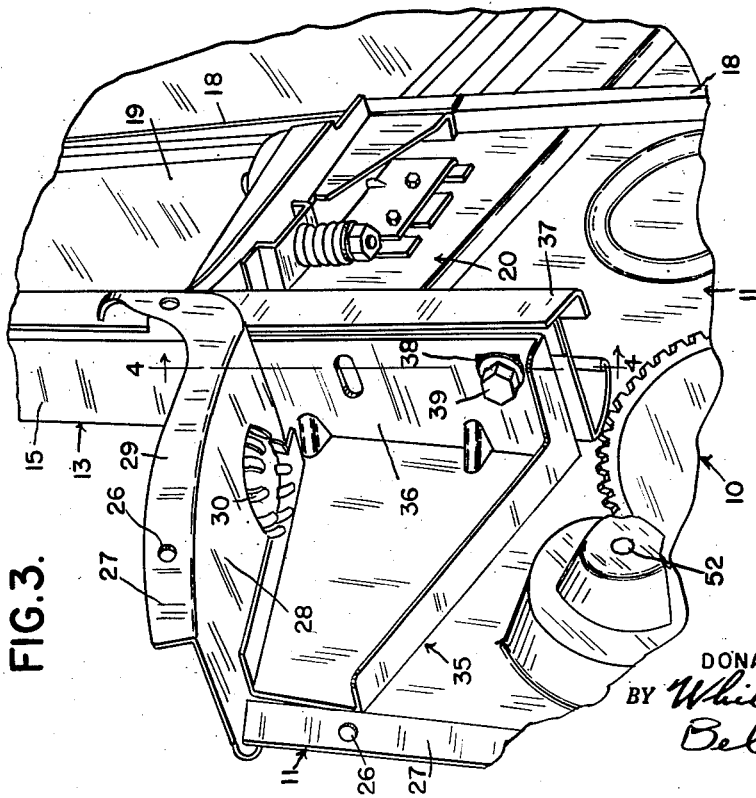
INVENTOR.
DONALD G. RENNO
BY Whittemore, Hulbert
Belknap
ATTORNEYS

United States Patent Office 2,797,128
Patented June 25, 1957

2,797,128

VEHICLE DOOR STRUCTURE

Donald G. Renno, Birmingham, Mich., assignor to Motor Products Corporation, Detroit, Mich., a corporation of New York Application February 6, 1956, Serial No. 563,686

9 Claims. (Cl. 296—44)

This invention relates to improvements in automotive doors of the general class having a composite structure wherein a separately formed upper frame surrounds the window opening on top and sides and is affixed to a lower door structure commonly composed of two unitary stampings that are marginally joined and longitudinally disposed in a spaced relationship to form a window-receiving well.

More particularly, this invention relates to improvements, in doors of the type above described, in the form of a door upper frame and inner panel sub-assembly, or "package," unit that greatly facilitates installation and adjustment of the usual door appurtenances such as ventilators, sliding glass, sliding glass regulators and door lock mechanisms. A unit of this sort is particularly well suited for an installation in which power operated window and/or ventilator mechanisms are employed.

Heretofore, in the manufacture of automotive doors of the type described, it has been customary to provide numerous individual sub-assemblies of the various appurtenances and to fit many of them to the door on a moving production line, after the basic or lower door has been assembled to the body structure. Variation in body structures, in the areas around the doors, make it desirable that means be provided for transversely displacing the upper door frame to facilitate proper matching with body surfaces since the upper frame is usually assembled after the lower or main part of the door has been hung and fitted to the body.

It is therefore an object of this invention to provide an upper door frame and inner panel sub-assembly, or "package," unit that will permit integration and prior bench-assembly of the upper door frame, glass and aforesaid appurtenances, with a provision for transverse adjustment of the upper frame for fitting purposes.

Specifically, it is an object of this invention to provide a unitary upper door frame and inner panel sub-assembly, or "package," unit comprising a principal inner panel of substantial area on which regulating, locking and operating mechanisms are mounted in an improved manner and a window frame to which the moving parts, as properly adjusted, are operatively connected, which frame has an improved adjustable connection to its associated inner panel enabling the frame to be pivoted for limited transverse displacement relative to the supporting lower door structure and the surrounding body structure, for fitting reasons. Any need to deform the door structure to fit it to the body is avoided.

The foregoing as well as other objects of the invention will become more apparent as this description proceeds, especially in connection with the accompanying drawings, in which:

Fig. 2 is a fragmentary perspective view of the upper frame and inner panel sub-assembly unit from the inner forward side thereof, portions of the supporting lower door assembly being shown in dotted line;

Fig. 3 is a corresponding fragmentary view of the upper frame and inner panel sub-assembly unit as seen from the outer forward side thereof;

Fig. 4 is a fragmentary view in section along line 4—4 of Fig. 3;

Fig. 6 is a fragmentary perspective view from the outer side of the structure shown in Fig. 5; and Fig. 7 is a fragmentary view in section along line 7—7 of Fig. 5.

Figure 5:
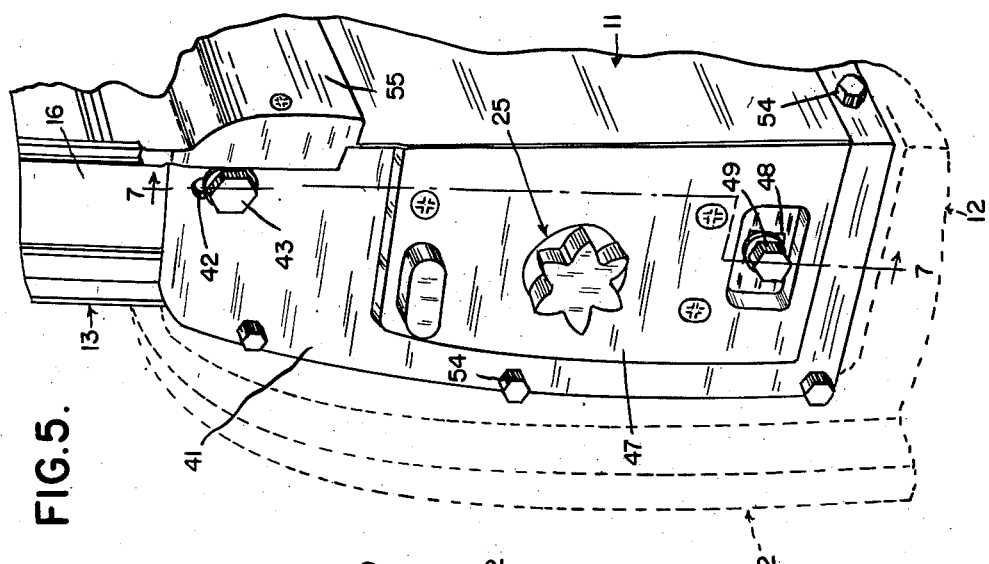
Fig. 5 is a fragmentary perspective view of an inner rear portion of the upper frame and inner panel sub-assembly unit, supporting lower door structure again being shown in dotted line.
Figure 1:
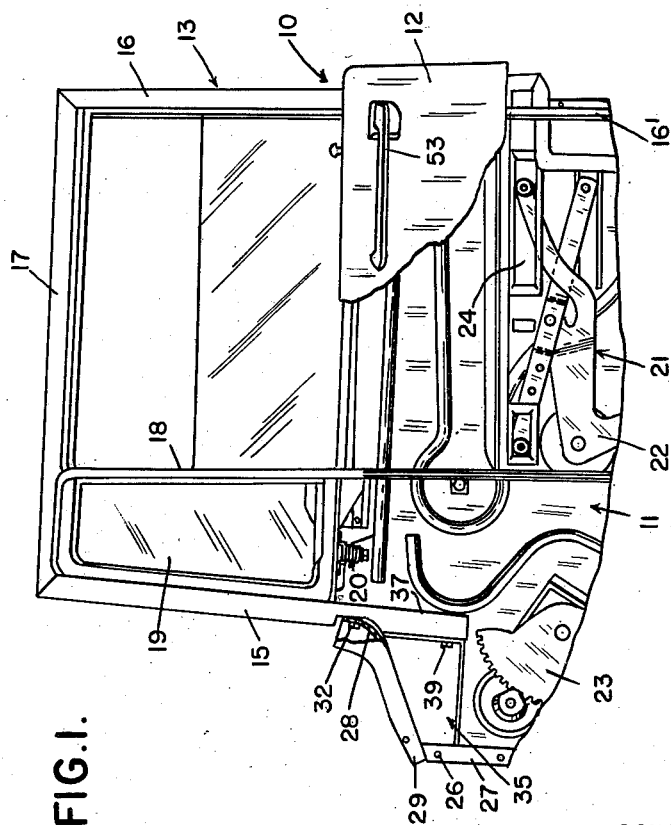
Fig. 1 is a fragmentary perspective view of the improved door upper frame and inner panel sub-assembly unit, as viewed from the outer side thereof, with a fragment of the supporting lower door assembly shown.

The door upper frame and inner panel sub-assembly unit 10 essentially comprises a rigid metal inner door panel 11, which may be substantially co-extensive in size with the supporting lower door structure 12 to which the sub-assembly unit 10 is subsequently assembled; and a window frame structure 13 adjustably associated with the inner panel 11 in the improved manner to be described. The frame structure 13 is conventional and in this embodiment is shown as produced from roll-formed sheet metal with an inwardly disposed channel formation. The frame structure 13 comprises front and rear bars 15, 16, respectively, joined by a top bar 17. An upright channelled division bar or post 18 which extends substantially downward with the door structure subdivides the frame 13 into a portion slidably receiving the window glass and a ventilator opening forwardly thereof, in which a ventilator window panel 19 is mounted for pivoting movement in a well known manner. The pivot structure for this ventilator is generally designated 20.

A regulator mechanism for the sliding window is generally designated 21, including a crossarm type lifting unit 22 which is controlled by a driving unit 23 and has an operating connection to the window at the sliding guides 24. A door lock mechanism (Figs. 5, 6, 7) which is generally designated by reference numeral 25 may also be mounted on the inner door panel 11, as will hereinafter be referred to; the mounting of the movable parts of these regulating and locking units on the inner panel 11 may be effected, if desired, as in the manner illustrated and described in my copending application, Serial No. 563,687, filed February 6, 1956.

The present invention is not concerned with the arrangements to this end, other than to the extent that the inner panel 11 serves as a support for the window regulating and door locking mechanisms and permits the prior assembly and adjustment of them. As finally assembled, the inner panel 11 is fastened to the lower door assembly 12, as by bolts or the like, in the peripherally arranged holes 26 in outwardly extending flanging 27 formed on the inner panel 11.

Referring now to Figs. 2, 3 and 4 of the drawings, which show the relationship of the door upper frame structure 13 and the inner panel 11 at the forward end of the upper frame and panel assembly, it is seen that the inner panel has an outwardly extending, downwardly inclined integral flange 28 of substantial width, which flange carries an upwardly turned lip or web 29 at which the panel 11 is bolted or otherwise secured to the lower door assembly 12. An access opening 30 is formed in the flange 28, being normally closed by a button plug. The flange extends downwardly and forwardly from a zone adjacent the front frame bar 15, at which zone the flange is provided with a vertically elongated pivot aperture or slot 31 (Fig. 4) to receive and horizontally confine a pivot bolt 32. The bolt 32 is threadedly received in a nut 33, or the like, secured to the inner surface of the frame bar 15, in alignment with a pivot opening in the latter and the window frame structure 13 is thus carried for adjustable pivoting and vertical shifting movement in relation to the inner panel 11 of the upper frame and inner panel unit 10 at this forward point.

As illustrated best in Figs. 3 and 4, a flanged plate, generally designated 35, is welded to the outwardly projecting flange 28 of panel 11, as well as to the panel proper, and the plate 35 has an outwardly extending, upright flange 36 against which the downward extension 37 of the front bar 15 abuts. The flange has a slot 38 of substantial vertical and horizontal dimensions adjacent its bottom extremity, and a lock bolt 39 is received in this slot so as to be threadedly engaged, in a desired swung and/or vertically shifted adjustment position of the frame 15, in a nut element 40 fastened to the rear or inner surface of the frame extension 37.

Referring now to Figs. 5, 6 and 7 of the drawings, a similar arrangement is made for pivoting the rear frame bar 16 on the inner panel 11 of the frame and inner panel assembly 10. The panel is provided with an outwardly extending flange portion 41, which flange has adjacent its top a vertically elongated pivot hole or slot 42 receiving and horizontally confining a pivoting bolt 43 which is threaded into a nut 44 fastened to the inner surface of the rear frame bar 16. The axes of the pivot bolt 32 of the front bar 15 and the bolt 43 just described are in approximate alignment to permit easy tilting of the frame structure 13 in relation to the body areas (not shown) adjacent the same.

In order to secure the rear frame bar 16 adjacent its bottom, in a manner generally similar to that employed in connection with the front bar 15, the member 16 is provided with a rigidly attached downward extension member 16' to which a U-shaped adapter bracket 45 is attached, the base portion 46 of the bracket 45 projecting outwardly of the extension 16'. The panel flange 41 is embossed as indicated at 47 to receive the lock structure 25 and has a slot 48 of substantial width and height receiving a lock bolt 49. This bolt is threadedly received in a nut 50 fastened to the inner surface of the base portion 46 of the bracket 45 which is attached to the frame bar extension 16', as described. Thus swing and vertical shift about the upper front and rear pivot bolts 32 and 43 are accommodated.

In fabricating the upper frame and inner panel unit 11, the frame 13 and the inner panel 11 are preliminarily assembled at the respective front and rear pivoting bolts 32, 43, threading the bolts into the nuts 33, 44, respectively; and the lower lock bolts 39, 49 at the front and rear, respectively, of the unit are inserted in the respective horizontally elongated slots 38, 48 of the panel 11 and threadedly engaged with the nuts 40, 50, respectively. With the upper frame structure 13 and the inner panel 11 positioned in their designed relationship the aforementioned bolts are tightened; ventilator unit 19 and the sliding window glass are installed, as are regulator units 22 and 23 and lock 25 with its associated remote control unit; the various units are then adjusted for proper fit and operation. The frame and panel unit 10 is then ready for assembly with the supporting lower door structure 12 which would ordinarily be hung and fitted to the automobile body. This assembly is accomplished by setting the complete upper frame and inner panel assembly 10 in place on the lower door structure 12 and fastening with bolts, or the like, designated 54 in the various figures.

When variation in the body structure surrounding the upper portions of the door results excessive misalignment the frame structure 13 can be adjusted to improve surface fit by loosening the several pivot and lock bolts 32, 43, 39, 49, displacing the frame transversely and/or vertically, as required, and then tightening these bolts to secure the frame in the adjusted condition. A conventional trim pad would be applied over the inner surface of the inner panel 11. The reference numeral 55 generally designates an inside finish moulding that trims and defines the lower inner edge of the window opening. Conventional inside door lock and regulator handles would then be applied.

The improved inner door panel and window frame unit is inexpensive of manufacture, is readily and easily fabricated and installed, and in the assembly and installation thereof permits two independent adjustments in reference to the door structure, i. e. an accurate adjustment of the various moving window and latch parts so that they thereafter operate reliably and properly, and an ultimate adjustment of the window frame portion to conform with and compensate for irregularities of the adjacent body surfaces. Although the unit affords these advantages in practically any type installation to which it is at all suited, its desirability is further enhanced when the window and/or ventilator actuator or regulator is power operated, as by an electric motor.

What I claim as my invention is:

1. A combined inner door panel and window frame unit for fixed assembly with an automotive or like lower door panel assembly, comprising an inner door panel adapted to mount a movable window panel operating mechanism, a window frame to receive a movable window panel structure, and means pivotally mounting said frame on said inner door panel to provide a lateral swinging adjustment of the frame in relation to the panel.

2. A combined inner door panel and window frame unit for fixed assembly with an automotive or like lower door assembly, comprising an inner door panel adapted to mount movable window operating mechanism, a window frame to receive movable window panel structure, said frame including forward and rearward upright frame members and said inner panel having outwardly extending flanges adjacent which said members are disposed, and means pivotally mounting said frame on said flanges of said inner door panel to provide for a lateral swinging adjustment of the frame in relation to the panel.

3. A combined inner door panel and window frame unit for fixed assembly with an automotive or like lower door assembly, comprising an inner door panel adapted to mount movable window operating mechanism, a window frame to receive movable window structure, said frame including forward and rearward upright frame members and said inner door panel having outwardly extending flanges adjacent which said members are disposed, and means pivotally mounting said frame on said flanges of said inner door panel to provide for a lateral swinging adjustment of said frame in relation to said inner door panel, comprising pivots hinging said frame members on said respective panel flanges adjacent to front and rear of said panel, and further lock means releasably holding said frame members in adjusted position.

4. A combined inner door panel and window frame unit for fixed assembly with an automotive or like lower door assembly, comprising an inner door panel adapted to mount movable window operating mechanism, a window frame to receive movable window panel structure, said frame including forward and rearward upright frame members and said inner door panel having outwardly extending flanges adjacent which said members are disposed, and means pivotally mounting said frame on said flanges of said inner door panel to provide a limited lateral swinging adjustment of the frame in relation to the inner door panel, comprising pivots hinging said frame members on said respective panel flanges adjacent to front and rear of said panel, and further lock means releasably holding said frame members in adjusted position, said lock means comprising members receivable in elongated holes in said flanges and threadedly engaging said respective frame members inwardly of said flanges.

5. A combined inner door panel and window frame unit for fixed assembly with an automotive or like lower door assembly comprising an inner door panel adapted to mount movable window panel operating mechanism, a window frame to receive movable window panel structure, said frame including upright front and rear members extending adjacent said inner door panel on the opposite ends thereof, and means pivotally mounting said frame on said inner door panel for lateral swinging adjustment thereon, comprising pivots hinging said frame members on the said inner door panel at said ends of the latter and means in vertically spaced relation to said pivots to lock said members to said inner panel upon swinging adjustment thereof.

6. A unit in accordance with claim 5 in which said panel has upwardly disposed front and rear portions and said front and rear frame members have upright portions lying adjacent said respective panel portions, said pivots hinging said frame and panel at said respective adjacent portions.

7. A unit in accordance with claim 5, in which said panel has upwardly disposed front and rear portions and said front and rear frame members have upright portions lying adjacent said respective panel portions, said pivots hinging said frame and panel at said respective adjacent portions, said means comprising a member for each of said respective adjacent portions which extends through a pivot aperture in one thereof and is received for translational adjustment in a slot in the other thereof.

8. A combined inner door panel and window frame unit for fixed assembly with an automotive or like lower door panel assembly, comprising an inner door panel adapted to mount a movable window panel operating mechanism, a window frame to receive a movable window panel structure, and means pivotally mounting said frame on said inner door panel to provide a lateral swinging adjustment of the frame in relation to the panel, said last named means having provision to afford lost motion at the pivotal mount of the frame and inner door panel to permit relative bodily shift thereof.

9. A combined inner door panel and window frame unit for fixed assembly with an automotive or like lower door assembly, comprising an inner door panel adapted to mount movable window operating mechanism, a window frame to receive movable window panel structure, said frame including forward and rearward upright frame members and said inner panel having outwardly extending flanges adjacent which said members are disposed, and means pivotally mounting said frame on said flanges of said inner door panel to provide for a lateral swinging adjustment of the frame in relation to the panel, said last named means having provision to afford lost motion at the pivotal mount of the frame and inner door panel to permit relative bodily shift thereof.

References Cited in the file of this patent

UNITED STATES PATENTS

| | | |
|---|---|---|
| 2,210,612 | Widman | Aug. 6, 1940 |
| 2,361,608 | Doty | Oct. 31, 1944 |
| 2,650,857 | Watter | Sept. 1, 1953 |
| 2,658,790 | Fish | Nov. 10, 1953 |
| 2,733,096 | Waterhouse | Jan. 31, 1956 |